July 23, 1935.  M. ZACK  2,008,846

PROCESS OF ARC WELDING AND CUTTING

Filed April 7, 1932

Inventor:
Michael ZACK
by Otto Munk his Attorney

Patented July 23, 1935

2,008,846

UNITED STATES PATENT OFFICE 2,008,846

PROCESS OF ARC WELDING AND CUTTING

Michael Zack, Cologne-on-the-Rhine, Germany

Application April 7, 1932, Serial No. 603,779
In Germany April 16, 1931

5 Claims. (Cl. 219—10)

My present invention relates to a process of electric arc welding and cutting with direct or alternate currents, which consists in using simultaneously two electrodes of different materials at least, and arranging said electrodes with relation to each other and to the working piece in such a way as to determine and maintain at least electric arcs between said electrodes and the working piece. According to the process claimed in my U. S. Patent No. 1,707,036, one of the electrodes is made of carbon and the other one made of metal, the arc of the first electrode serving chiefly to produce heat for the welded joint, whilst the other electrode contains in first place the materials to be introduced into the welded joint.

According to my present invention I introduce water or steam into the arc, such water or steam being decomposed by the action of the electrode formed of suitable materials, to produce combustible gas, whereby the heating action of the electrode or arc respectively will be increased. Moreover in case of welding the second electrode contains preferably a substance which on one hand is adapted to improve the welded joint and on the other hand serves as a contact substance for the chemical process in the heating electrode.

According to my invention the heating electrode is mainly made by means of carbon or other constituents, adapted to decompose steam into hydrogen gas and oxygen at the temperature of the arc. To the carbon are added for instance carbonates of alkali metals or different compounds of alkaline earth-metals. The second electrode may contain for instance tungsten as a constituent, which on one hand produces a favorable influence on the welded joint, and on the other hand serves as a contact substance.

By a suitable selection of the materials from which the electrodes are made—such selection being made according to practical experiments—the production of combustible gas, mainly hydrogen gas, will be accommodated to the circumstances and the particular metal to be worked. If it is desired to produce other combustible gases, for instance acetylene, one of the electrodes will be made from a mixture of carbon and CaO.

Figure 1:
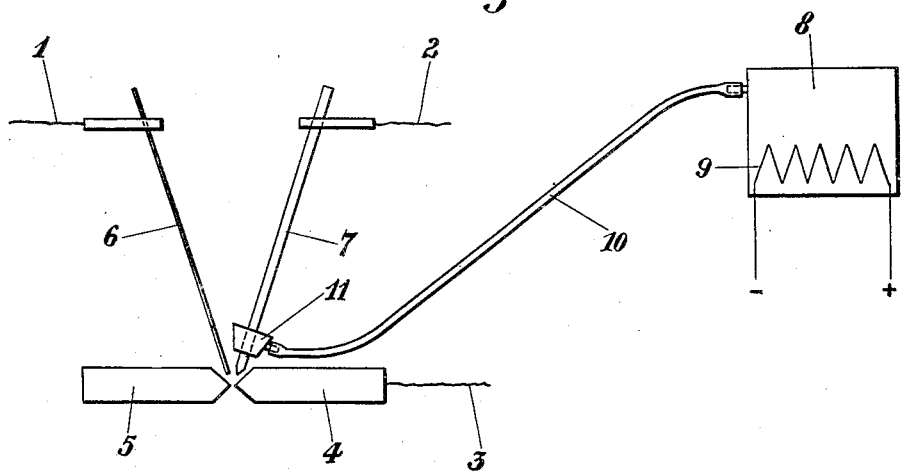
Figure 2:
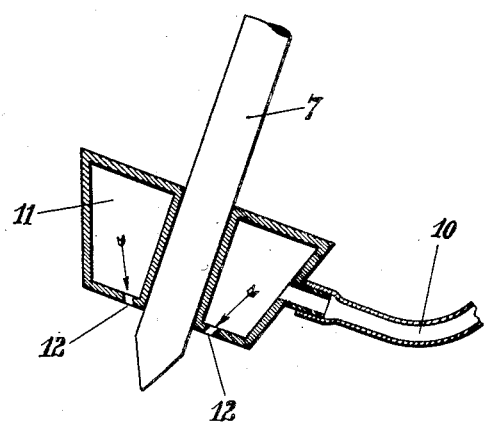

A device for carrying out the process of the invention has been illustrated quite schematically and by way of example only in the accompanying drawing wherein Fig. 1 is a general view of the device, and Fig. 2 is a detail view partly in section.

The device is shown applied to the use of triphase current. The current is available on the three conductors 1, 2, 3, the last of which is connected to the work piece consisting of two pieces 4, 5 to be welded together. The conductor 1 is connected to the metal electrode 6. The conductor 2 is connected to the heating carbon electrode 7. A generator 8, heated by means of an electric heating resistance 9, is adapted to send steam by the pipe 10 into an annular chamber 11 fixed around the heating electrode 7. This chamber is provided with a series of holes 12 disposed in a circle around the electrode, directed towards the arc, and whereby steam will be directed into the arc during the welding operation.

Having now fully described my said invention, what I claim and desire to secure by Letters Patent, is:

1. An improved process of arc welding and cutting with direct or alternate currents, which consists in using simultaneously two electrodes at least, arranging said electrodes with relation to each other and to the working piece in such a way as to determine and maintain at least electric arcs between said electrodes and the working piece, introducing water into the electric arc mainly serving to produce heat for the welding or cutting joint, making the electrode which produces said arc of a material adapted to decompose said water and to produce combustible gas at the temperature of the arc, and using at least one electrode containing a contact substance adapted to assist the production of hydrogen gas.

2. An improved process of arc welding and cutting with direct or alternate currents, which consists in using simultaneously two electrodes at least, arranging said electrodes with relation to each other and to the working piece in such a way as to determine and maintain at least electric arcs between said electrodes and the working piece, introducing steam into the electric arc mainly serving to produce heat for the welding or cutting joint, making the electrode which produces said arc of a material adapted to decompose said steam and to produce combustible gas at the temperature of the arc, and using at least one electrode containing a contact substance adapted to assist the production of hydrogen gas.

3. An improved process of electric arc welding and cutting, comprising the use simultaneously of an electrode of carbon containing a compound of an alkali metal, and of an electrode of metal containing a catalyzer for the decomposition of steam, and comprising the step of introducing steam in the arc formed between said electrodes and the work piece.

4. An improved process of electric arc welding and cutting which consists in introducing water in the arc formed by several electrodes, one of which is made of carbon and another of which contains a catalyzer adapted to assist the decomposition of water in the heat of the arc.

5. An improved process of electric arc welding and cutting which consists in introducing steam in the arc formed by several electrodes, one of which is made of carbon and another of which contains a catalyzer adapted to assist the decomposition of steam in the heat of the arc.

MICHAEL ZACK.